US011591902B2

United States Patent
Donderici et al.

(10) Patent No.: US 11,591,902 B2
(45) Date of Patent: Feb. 28, 2023

(54) DETECTING A MOVEABLE DEVICE POSITION USING FIBER OPTIC SENSORS

(71) Applicant: Halliburton Energy Services, Inc., Houston, TX (US)

(72) Inventors: Burkay Donderici, Houston, TX (US); Ahmed E. Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 533 days.

(21) Appl. No.: 15/531,840

(22) PCT Filed: May 16, 2016

(86) PCT No.: PCT/US2016/032688
§ 371 (c)(1),
(2) Date: May 31, 2017

(87) PCT Pub. No.: WO2017/200523
PCT Pub. Date: Nov. 23, 2017

(65) Prior Publication Data
US 2019/0063213 A1    Feb. 28, 2019

(51) Int. Cl.
*E21B 47/09* (2012.01)
*G01V 3/38* (2006.01)
(Continued)

(52) U.S. Cl.
CPC .............. *E21B 47/09* (2013.01); *E21B 34/14* (2013.01); *E21B 47/13* (2020.05); *E21B 47/135* (2020.05);
(Continued)

(58) Field of Classification Search
CPC ........ E21B 47/09; E21B 47/14; E21B 47/123; E21B 47/01; E21B 34/14; E21B 34/22;
(Continued)

(56) References Cited

U.S. PATENT DOCUMENTS 5,666,050 A    9/1997  Bouldin et al.
6,281,489 B1   8/2001  Tubel et al.
(Continued)

OTHER PUBLICATIONS

International Search Report and The Written Opinion of the International Search Authority, or the Declaration, dated Jan. 6, 2017, PCT/US2016/032688, 25 pages, ISA/KR.

*Primary Examiner* — Lee E Rodak
*Assistant Examiner* — Trung Q Nguyen
(74) *Attorney, Agent, or Firm* — John Wustenberg; C. Tumey Law Group PLLC

(57) ABSTRACT

Fiber optic sensors are described for detecting the operational position of a downhole moveable device. In one example, an electric or magnetic field is emitted into the wellbore and interacts with the moveable assembly, thereby producing a secondary electric or magnetic field. The secondary field is detected by a fiber optic sensor which produces a corresponding response signal. The response signal is then processed in a variety of ways to determine the operational position of the moveable device. In another example, the operational position is determined using fiber optic temperature or acoustic sensors. A temperature or acoustic vibration reading is acquired before and after actuation of the moveable device. The two readings are then compared to determine the operation position of the moveable device.

21 Claims, 9 Drawing Sheets

(51) Int. Cl.
*G01D 5/26* (2006.01)
*G01V 3/26* (2006.01)
*E21B 34/14* (2006.01)
*G01V 3/18* (2006.01)
*E21B 47/13* (2012.01)
*E21B 47/135* (2012.01)
*E21B 47/14* (2006.01)

(52) U.S. Cl.
CPC ............... *E21B 47/14* (2013.01); *G01V 3/18* (2013.01); *G01V 3/26* (2013.01); *G01V 3/38* (2013.01); *G01D 5/268* (2013.01)

(58) Field of Classification Search
CPC . G01D 5/268; G01V 3/38; G01V 3/26; G01V 3/18
USPC ... 324/338–371, 323, 200, 207.13–247, 500, 324/529, 530, 160, 177–179, 329, 637
See application file for complete search history.

(56) References Cited

U.S. PATENT DOCUMENTS

| | | | |
|---|---|---|---|
| 6,491,102 B2 | 12/2002 | Leismer et al. | |
| 6,995,352 B2 | 2/2006 | Hay et al. | |
| 7,000,698 B2 * | 2/2006 | Mayeu | E21B 47/135 166/255.1 |
| 7,040,390 B2 | 5/2006 | Tubel et al. | |
| 7,810,564 B2 | 10/2010 | Montgomery et al. | |
| 2003/0221829 A1 * | 12/2003 | Patel | E21B 43/084 166/278 |
| 2004/0117119 A1 * | 6/2004 | West | G01V 11/00 702/6 |
| 2004/0140092 A1 * | 7/2004 | Robison | E21B 47/135 166/66 |
| 2005/0034857 A1 * | 2/2005 | Defretin | E21B 47/09 166/250.01 |
| 2005/0279496 A1 | 12/2005 | Fontenot et al. | |
| 2006/0072869 A1 | 4/2006 | Vidal et al. | |
| 2006/0157239 A1 * | 7/2006 | Ramos | E21B 47/09 166/254.2 |
| 2008/0236819 A1 | 10/2008 | Foster et al. | |
| 2009/0128141 A1 * | 5/2009 | Hopmann | E21B 47/092 324/207.24 |
| 2011/0044575 A1 * | 2/2011 | Lagakos | G01K 5/62 385/12 |
| 2016/0215612 A1 * | 7/2016 | Morrow | E21B 47/017 |
| 2017/0167249 A1 * | 6/2017 | Lee et al. | E21B 47/14 367/83 |
| 2017/0212262 A1 * | 7/2017 | Yao | G01N 29/46 |
| 2017/0275985 A1 * | 9/2017 | Fouda | E21B 34/06 |
| 2018/0202288 A1 * | 7/2018 | Elbadawy | E21B 7/04 |

* cited by examiner

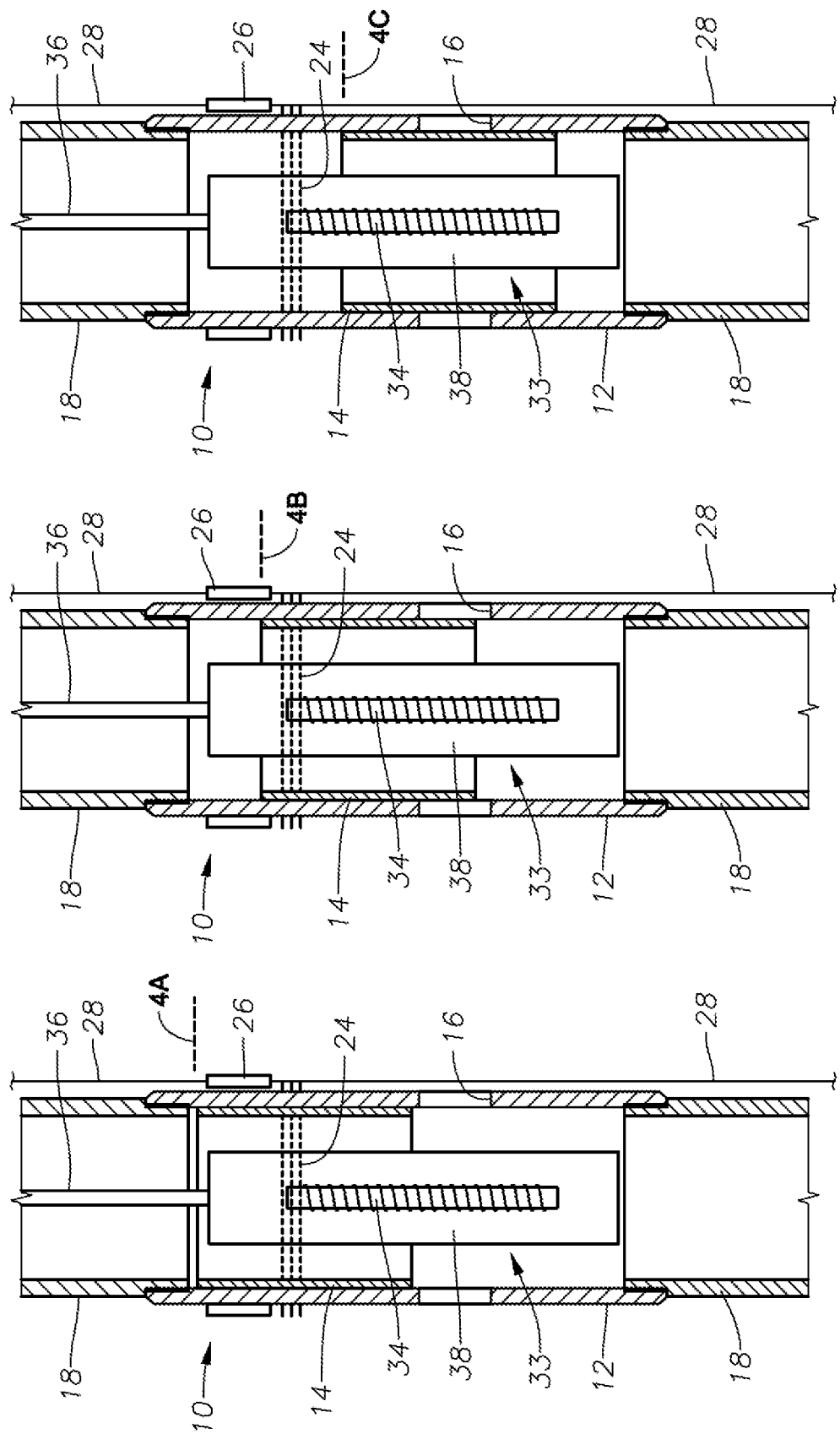

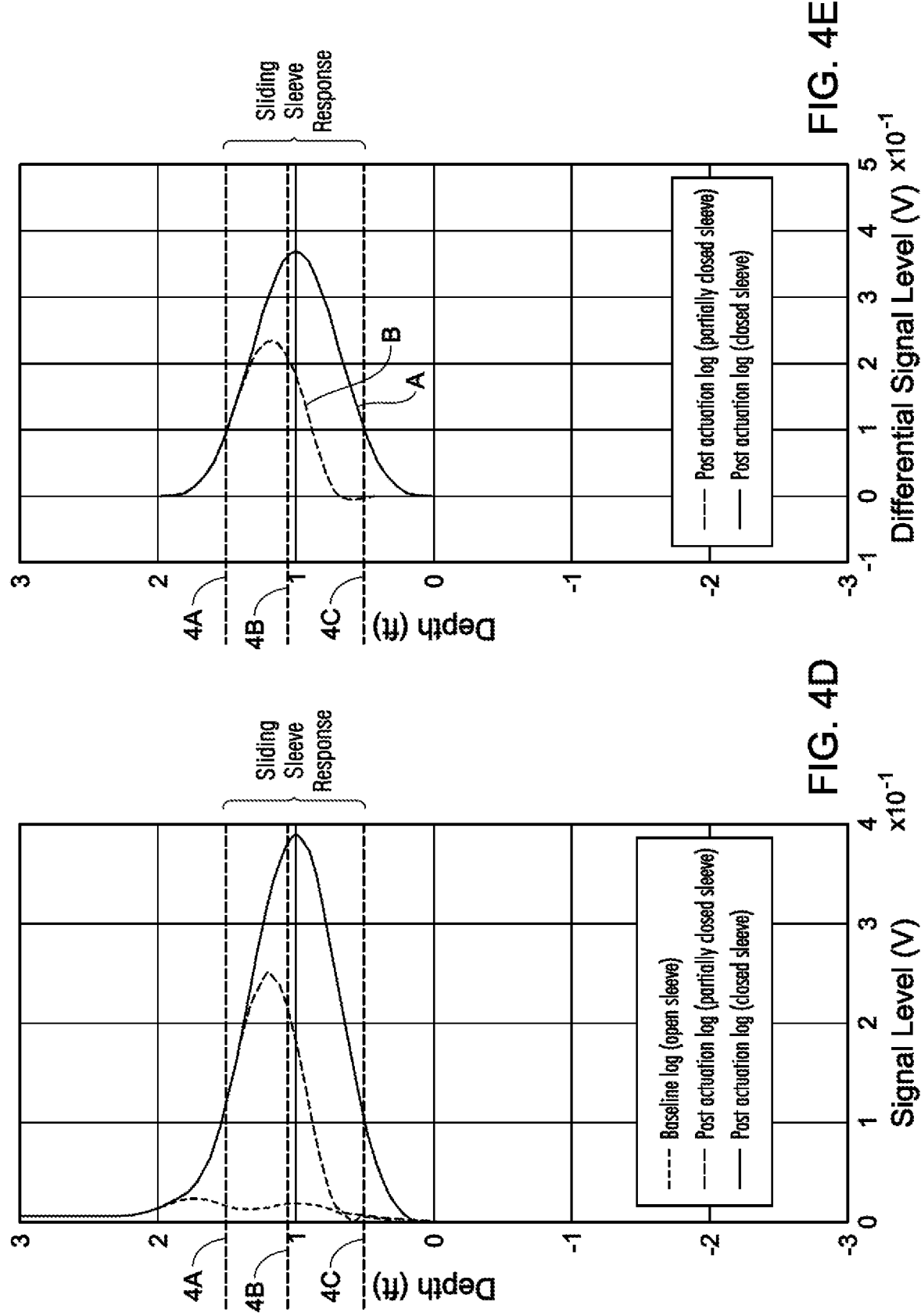

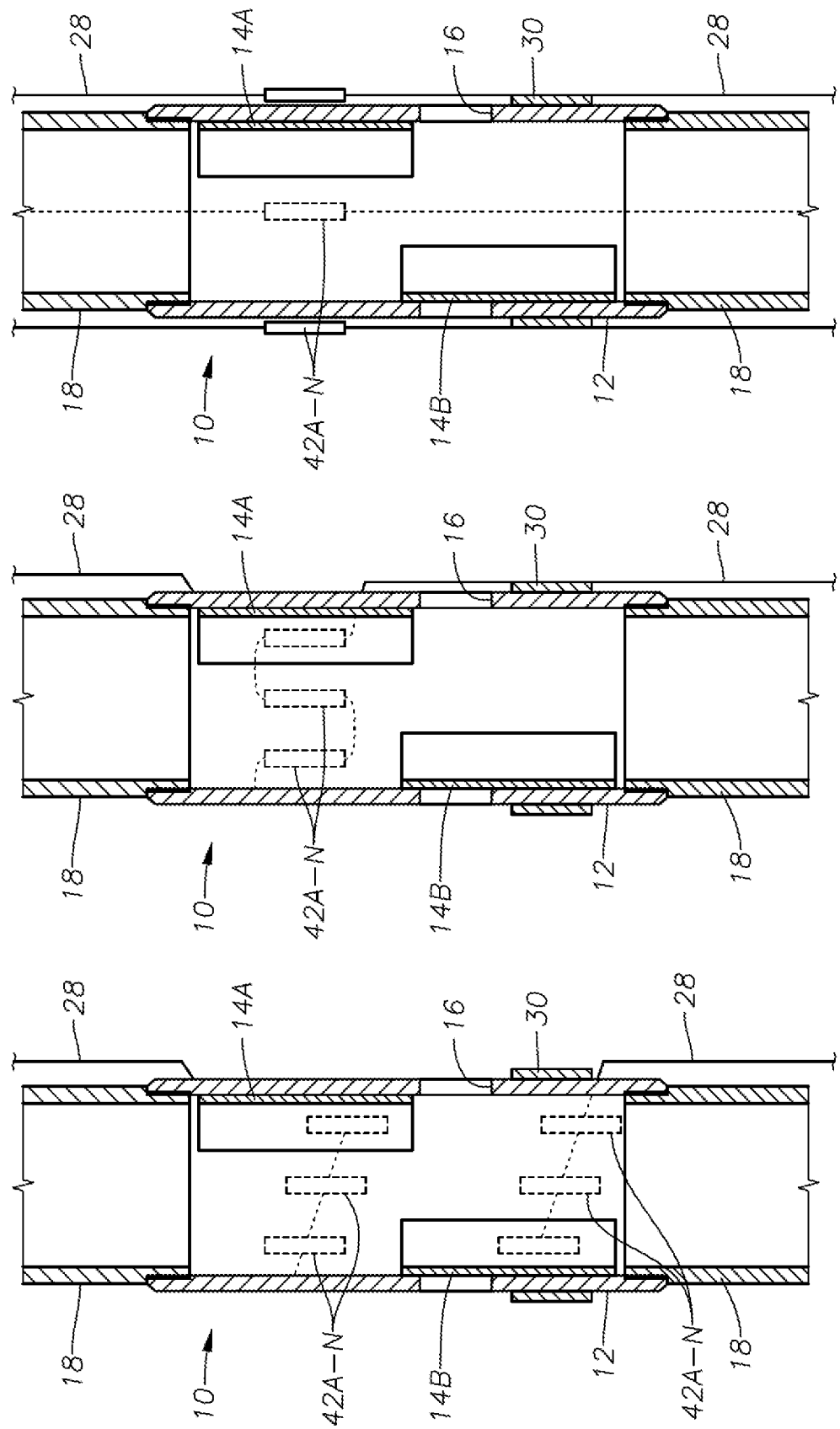

DETECTING A MOVEABLE DEVICE POSITION USING FIBER OPTIC SENSORS

PRIORITY

The present application is a U.S. National Stage patent application of International Patent Application No. PCT/US2016/032688, filed on May 16, 2016, the benefit of which is claimed and the disclosure of which is incorporated herein by reference in its entirety.

FIELD OF THE DISCLOSURE

Embodiments of present disclosure generally relate to the use of downhole moveable devices and, more particularly, to a method for detecting the operational position of a moveable device (e.g., sliding sleeve) using fiber optic sensors.

BACKGROUND

Moveable devices are used downhole to perform a number of functions. These devices may include, for example, chokes, sliding sleeves, and other valves. Sliding sleeve valves, for example, are used downhole to control and regulate fluid flow through tubulars. Controlling fluid flow is important for various economic reasons. For example, sliding sleeves can be used to shut off zones producing too much water or depleting hydrocarbons produced by other zones. Typically, sliding sleeve valves consist of an external housing that is threaded to the tubing string. The housing has openings, known as flow ports, to allow fluid flow into or out of the tubing. Inside the housing, there is a sliding sleeve, known as the insert, whose axial position with respect to the housing is adjustable to open or close the flow ports.

Sliding sleeves are either mechanically or hydraulically actuated. Mechanical actuation involves using a lock that is run in the well on a wireline, coiled tubing or slickline tool. The lock engages onto a nipple in the sliding sleeve, and is then used to adjust the position of the sleeve. Hydraulic actuation involves using a hydraulic pump at the surface and more complicated actuation mechanisms.

In all cases, it is highly desirable to detect the operational condition of the sleeve (open/closed/partially open) after actuation. Historically, this was done by mechanically sensing the gap between the endpoint of the insert and the housing. Such mechanical detection involves using deployable arms and in contact measurements. It can, therefore, be unreliable and difficult to interpret in many cases.

Methods to detect the position of sliding sleeves using magnets and wireline or memory tools were disclosed in U.S. Patent App. Publication No. 2008/0236819 (Foster et al.), entitled "Position sensor for determining operational condition of downhole tool", and U.S. Pat. No. 7,810,564 (Montgomery et al.), entitled "Memory logging system for determining the condition of a sliding sleeve." These methods involve disposing magnets in predetermined positions along the sliding sleeve housing and insert, and using a magnetic field detection tool, such as casing collar locator, to detect the relative position between these magnets, from which the operational condition of the sleeve is inferred. Another method was disclosed in U.S. Pat. No. 7,000,698 (Mayeu et al.), entitled "Methods and systems for optical endpoint detection of a sliding sleeve valve," whereby fiber optic based sensors where utilized for endpoint detection of sliding sleeves. The optical sensors are positioned in a recess in the valve housing, and are used to detect the stress imparted by the moving sleeve.

The drawback of all the above methods is that they only work for customized sliding sleeves equipped with magnets or optical sensors or they require logging of the tubing. This increases the cost and complexity of the sliding sleeves in new deployments, and makes the detection methods unusable for existing deployments having conventional sleeves. Moreover, the conventional methods can only detect whether the sleeve is in a fully open or fully closed position.

BRIEF DESCRIPTION OF THE DRAWINGS

FIGS. 4A, 4B and 4C are sectional views of a magnetic-type logging tool positioned within a sliding sleeve assembly in a fully open, partially closed, and fully closed operational position, respectively, according to certain illustrative embodiments of the present disclosure;

FIG. 4D depicts a log of response signal level verses depth for an open, partially closed, and fully closed sleeve assembly;

FIG. 4E illustrates the electromagnetic signal level verses depth of two differential logs (A/B) of a baseline and response log taken from FIG. 4D;

FIGS. 4A and 4B illustrate logging tools that azimuthally determine the operational position of multiple sliding sleeves, according to certain illustrative embodiments of the present disclosure;

FIGS. 7A-7C are various illustrations of downhole assemblies described herein used to azimuthally detect the operational positions of multiple moveable devices;

DESCRIPTION OF ILLUSTRATIVE EMBODIMENTS

Figure 1A:
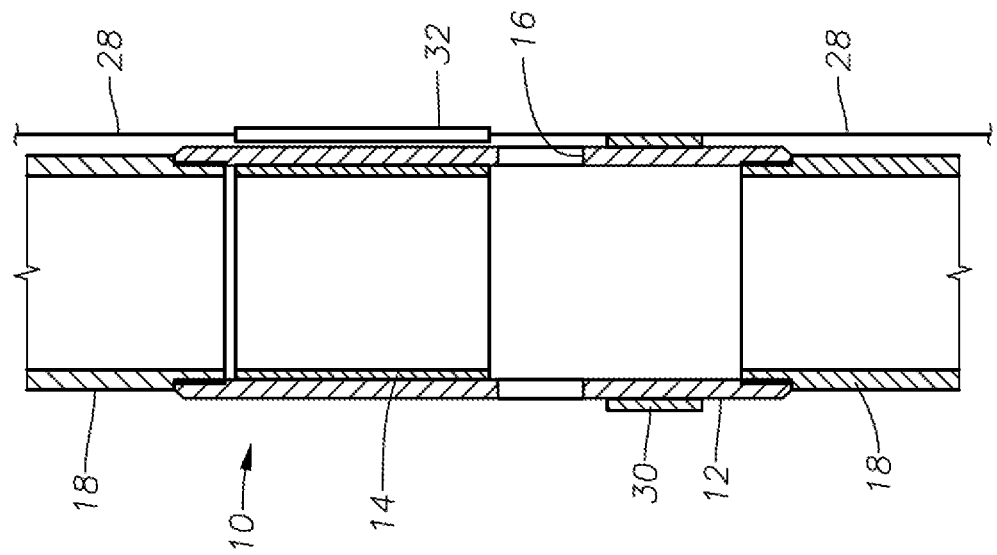
FIG. 1A is a sectional view of a downhole assembly used to determine the position of a sliding sleeve assembly, according to certain illustrative embodiments of the present disclosure.

Illustrative embodiments and related methods of the present disclosure are described below as they might be employed in a method for detecting the operational position of a moveable device using fiber optic sensors. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative methods of the present disclosure are directed to detecting the operational position of a downhole moveable device using fiber optic sensors. Although this description discusses sliding sleeves, the present disclosure is applicable to a variety of moveable devices, such as, for example, chokes, valves, and other downhole moveable devices. In an illustrative generalized method, a fiber optic sensor is deployed into a wellbore a moveable assembly positioned along a tubular workstring. An electrical or magnetic field is emitted into the wellbore and interacts with the moveable assembly, thereby producing a secondary electrical or magnetic field. The secondary field is then detected by a fiber optic sensor which produces a corresponding response signal. The response signal is then processed in a variety of ways to determine the operational position of the moveable device. In one method, the response signal itself is used to determine the operational position. In another method, the operational position is determined by comparing a log of response signals acquired while the moveable device is in a non-actuated position (i.e., baseline log) to a log of response signals acquired while the moveable device is in an actuated position (i.e., response log). Note, however, as described herein the baseline log may simply refer to a first log, while the response log refers to a subsequent log.

In yet other embodiments described herein, the operational position of a downhole moveable device is detected using fiber optic temperature or acoustic sensors. In the case of fiber optic temperature sensors, the temperature of the moveable device is measured before and after actuation. The two temperature readings are then compared, whereby the operational position is determined. In the case of a fiber optic acoustic sensor, acoustic vibrations of the moveable device are measured before and after actuation of the moveable device. The two acoustic vibration readings are compared, whereby the operation position is determined.

The fiber optic sensors described herein may be more specifically referred to as fiber optic magnetic or electric field sensors. The fiber optic sensors may be permanently or temporarily deployed downhole. For example, the fiber optic sensors may be attached to the outside of a tubular workstring (e.g., casing or production tubular) using clamps as the workstring is deployed downhole, for example. As a result, the disclosed embodiments of the present disclosure provide real-time, interventionless detection, since the detection may be achieved via permanently deployed sensors. As a result, in this illustrative method, no logging operation is required. Also, no substantial changes in the design of existing sliding sleeves are required to accommodate the sensors described herein. Moreover, multiplexing along the same fiber optic line may be used to accommodate multiple sensors which monitor multiple valves. As a result, there is no need for active electronic components and circuits downhole. Additionally, the illustrative embodiments described herein may be integrated and operated with a variety of other optical sensor systems, such as, for example, distributed acoustic or temperature optical sensors.

Furthermore, although the description focuses on the use of magnetic field transmitters/receivers, other types of transmitters/receivers may be used, such as, for example, electric or electromagnetic field transmitters/receivers. Such an alteration would be readily understood by those ordinarily skilled in the art having the benefit of this disclosure.

FIG. 1A is a sectional view of a downhole assembly used to determine the position of a sliding sleeve assembly, according to certain illustrative embodiments of the present disclosure. In FIG. 1A, sliding sleeve assembly (e.g., valve) 10 is shown in the open position, and consists of an external housing 12, a sliding sleeve 14, and flow ports 16. Housing 12 is threaded to a tubing string 18, such as, for example, a casing string or production string, which is filled with tubing fluids. Sliding sleeve assembly 10 may contain other internal components, such as, for example, top and bottom internal collars (not shown) used to limit the stroke of the sliding sleeve.

According to one illustrative embodiment of the present disclosure, a magnetic field transmitter 20 (e.g., a transmitting coil) is wrapped around sliding sleeve housing 12. Transmitter 20 is excited from the surface using power cable 22. Although not shown, in alternative embodiments, multiple transmitter coils may be affixed to multiple sliding sleeve assemblies, connected in series and excited using the same power cable. Nevertheless, in certain embodiments, when operated at low frequencies (e.g., 10-1000 Hz), the transmitting coil 20 generates magnetic fields that are guided through the magnetically permeable steel walls of housing 12 and sliding sleeve 14.

A magnetic field receiver 24 (e.g., a pick-up coil) is wrapped around housing 12 at a distance of, for example, ~0.5 ft from transmitter 20. The voltage across the terminals of receiver 24 is proportional to the magnetic flux density traversing receiver 24. As the thickness of the magnetically permeable steel walls adjacent receiver 24 increase in thickness, the magnetic flux density also increases. The magnetic flux density will, in part, be generated by a secondary magnetic field induced in sleeve 14 as a result of its interaction with the magnetic field emitted from transmitter 20. Therefore, the signal received at receiver 24 may be used to determine the operational position of sliding sleeve 14 with respect to the monitoring coils (i.e., transmitter 20 and receiver 24). This operational position may be fully open, partially open, or closed.

Figure 1B:
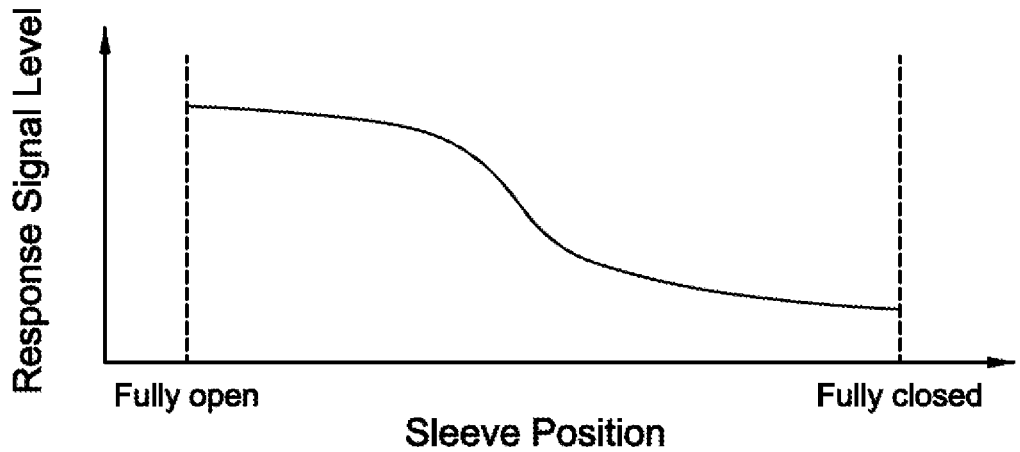
FIG. 1B illustrates the response signals of an illustrative sliding sleeve along a continuum of fully open, intermediate, and fully closed.

For example, when sleeve 14 is in the fully open position as shown is FIG. 1A, a maximum response signal is detected. As sleeve 14 slides downwards towards a fully closed position, the measured signal decreases. FIG. 1B illustrates this principle, as it shows the response signals of an illustrative sliding sleeve along a continuum of fully open, intermediate, and fully closed. Part of this response signal is due to stationary features in sliding sleeve assembly 10, such as housing 12, flow ports 16 and other stationary internal components. This portion of the response signal is independent of the sliding sleeve position. However, another portion of the response signal is due to sliding sleeve 14; this portion of the response signal varies with the position of sliding sleeve 14. In general, for any sleeve position, there exists a unique response signal pattern (i.e., signature) which is the combination of response signals due to stationary and movable features in sliding sleeve assembly 10.

To fully describe the disclosed embodiment, the terminals of the receiver 24 are coupled to fiber optic sensor 26. In one illustrative embodiment, fiber optic sensor 26 consists of an electromechanical transducer (e.g., a piezoelectric transducer) that is bonded to fiber optic cable 28. The voltage potential across the terminals of receiver 24 is applied to the transducer of fiber optic sensor 26. As the electro-mechanical transducer deforms due to the applied potential, it induces strain in optical fiber 28 bonded to it, thus producing a response signal in cable 28 which can be interrogated at the surface with a light detection unit using, for example, using a variety of methods. Thus, the illustrative embodiment eliminates any need for multiplexing circuitry downhole. Also, note the illustrative system is operated such that the strain (and, thus, the response signal) is linearly proportional to the applied potential.

In another illustrative embodiment (not shown), the receiver and electromechanical transducer of FIG. 1A may be replaced with a magnetostrictive material bonded to fiber optic cable 28. Examples of magnetostrictive materials include, for example, cobalt, nickel, and iron metals and their alloys, e.g., metglass and Terfenol-D. As the magnetostrictive material deforms due to the incident, or secondary, magnetic field, it induces strain in optical fiber 28 bonded to it, thus resulting in a response signal in the fiber that can be interrogated at the surface, the downhole environment, or some other remote location. In certain embodiments, the magnetostrictive sensors are packaged in electromagnetic compatible high pressure, high temperature packages that are connected to, for example, a fiber optic tubing encapsulated cable ("TEC") (i.e., fiber cable 28), and clamped to the tubing 18 as it is being deployed. Examples of such packaging materials include Inconel and BeCu.

As shown in FIG. 1A, response signals from other fiber optic sensors (at different axial locations along tubing 18) can be communicated over the same fiber optic cable 28. Also, their respective transmitters 22 can also be powered via cable 22. Alternatively, they may be powered using a local battery or some other downhole source. Response signals from different receivers are discriminated at the surface using various fiber optic multiplexing and interrogation techniques, as will be understood by those ordinarily skilled in the art having the benefit of this disclosure.

Figure 2:
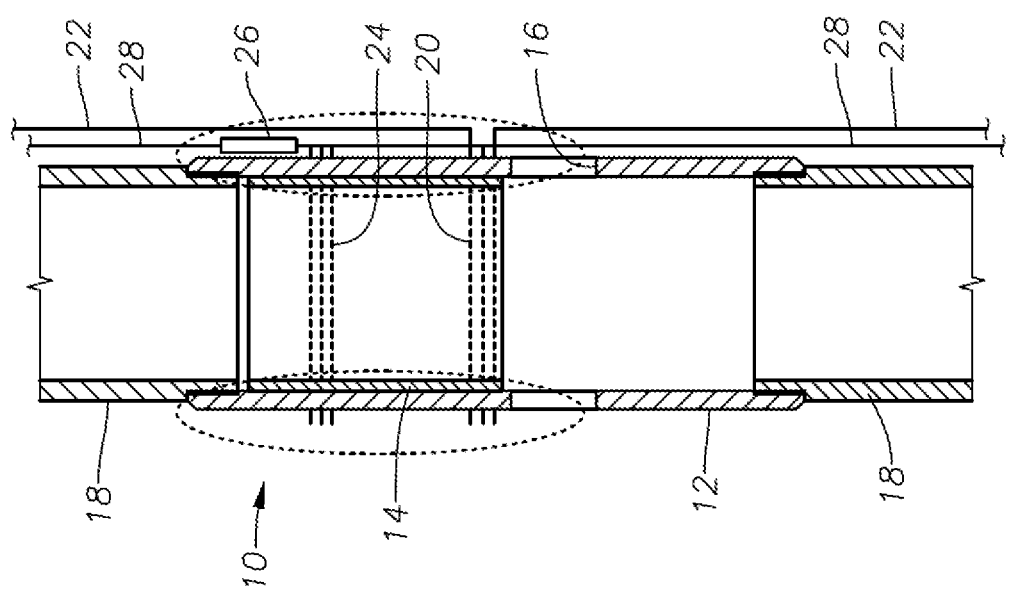
FIG. 2 is a sectional view of a downhole assembly used to determine the position of a sliding sleeve assembly, according to certain alternative illustrative embodiments of the present disclosure.

FIG. 2 is a sectional view of a downhole assembly used to determine the position of a sliding sleeve assembly, according to certain alternative illustrative embodiments of the present disclosure. The embodiment of FIG. 2 is similar to that of FIG. 1A, as like numerals refer to like elements. However, in FIG. 2, the transmitting coil of FIG. 1A is replaced with a permanent magnet 30 affixed to the outside of sliding sleeve housing 12. In this embodiment, sliding sleeve 14 must be pre-magnetized by actuating it several times up and down (i.e., between open/closed positions). As sleeve 14 slides past magnet 30, the magnetic field emitted from magnet 30 magnetizes sleeve 14, thus producing a secondary magnetic field in sleeve 14. In this example, fiber optic magnetic field sensor 32 is a magnetostrictive material bonded to fiber 28 that detects the differential increase in magnetic fields as the magnetized sleeve 14 comes adjacent to sensor 32. Also, in this embodiment, a fiber optic sensor 32 is extended to have the same length as sliding sleeve 14. As a result, the detected response signal is proportional to the length of sleeve 14 overlapping with extended sensor 32. An example sleeve response will follow the signal response level illustrated in FIG. 1B.

Figure 3:
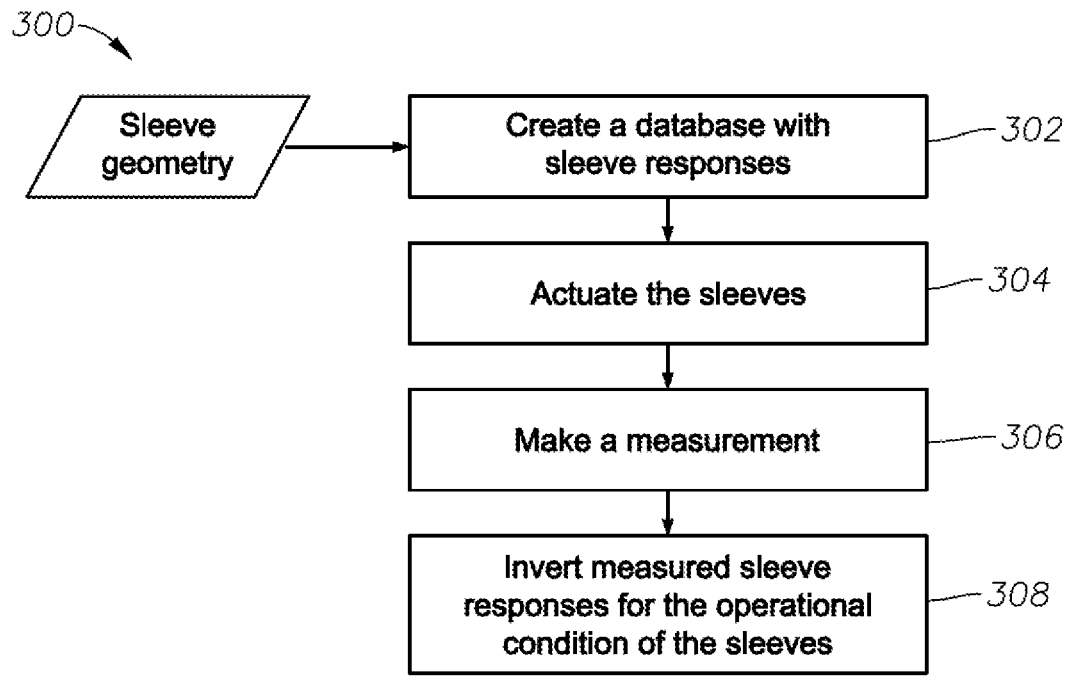
FIG. 3 is a flow chart of method 300 in which a baseline log library is utilized, according to certain illustrative methods of the present disclosure.

To detect the operational condition of a moveable device, a pre-deployment characterization of the moveable device response can be made in certain illustrative methods. Accordingly, FIG. 3 is a flow chart of method 300 in which a baseline response/log library is utilized. In order to eliminate the ambiguity with an in-situ baseline response/log, pre-deployment surface characterization of the sleeve response, including sleeve geometry, can be made and stored in a baseline library. According to this alternative method, a database (i.e., baseline response/log library) is created which includes the magnetic responses of the sleeve at all operational positions (block 302). After deployment, the sleeve is actuated at block 304. To detect the operational position of deployed sleeves, only one response log is made (no in-situ baseline log is needed in this case) at block 306. At block 308, the response of each sleeve in the log is inverted for the operational position of that sleeve. Inversion may be performed in a variety of ways, including, for example, performing pattern recognition techniques between the measured response and those stored in the library. Note that different libraries with be required for different types of sleeves. Therefore, in this method, the type of sleeve used downhole needs to be known a priori to in order to apply the correct database for inversion.

The methods described herein may be performed using processing circuitry located at the surface, along the downhole assembly, or forming part of the downhole assembly itself. The processing circuitry may be embodied as a light detection unit that, among other functions, controls the operation of a light source, receiver, etc., as well as the processing of the received backscattered light signals (i.e., response signals) for determination of operational positions of the moveable devices. Regardless of the position of the processing circuitry, it is communicably coupled to the transmitting/receiving coils and fiber optic sensors using any desired communication technique. Although not shown, the processing circuitry may include at least one processor, a non-transitory, computer-readable storage (also referred to herein as a "computer-program product"), transceiver/network communication module, optional I/O devices, and an optional display (e.g., user interface), all interconnected via a system bus. Software instructions executable by the processor for implementing the illustrative methods described herein, may be stored in the local storage medium or some other computer-readable medium.

Moreover, those ordinarily skilled in the art will appreciate that embodiments of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. Embodiments of the disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

In other illustrative methods described herein, a logging tool is used to determine the operational position of a moveable device, such as, for example, a sliding sleeve. In such methods, a baseline log is recorded before the sleeve is actuated. After partial or complete actuation, another log (i.e., response log) is recorded. Comparison of the two logs enables the detection of the distance the sleeve moved after actuation. Given the dimensions of the sleeves and the maximum displacement they can move, the distance the sleeves moved after actuation relative to the baseline is correlated to the operational condition of the sleeves (open/closed/partially open).

In the methods described herein, the baseline log may be generated in a variety of ways. For example, the baseline log can be made at the surface before deployment when the operational position of each sleeve is known. As such, the distance the sleeve moved after actuation relative to the baseline can be precisely related (e.g., using inversion) to the operational position of the sleeves. In other methods, the baseline log may be taken from a library of baseline logs compiled before deployment of the sleeve. In yet another method, the baseline log may be generated downhole in the wellbore before the sleeve is actuated.

FIGS. 4A, 4B and 4C are sectional views of a magnetic type logging tool positioned within a sliding sleeve assembly in a fully open, partially closed, and fully closed operational position, respectively, according to certain illustrative embodiments of the present disclosure. The embodiments of FIGS. 4A-C are similar to that of FIG. 1A, and thus like numerals refer to like elements. In this embodiment, however, the transmitter is mounted on a logging tool and any of the fiber optic sensors described herein can be used as the receiver. Sliding sleeve assembly (e.g., valve) 10 consists of an external housing 12, a sliding sleeve 14, and flow ports 16. Housing 12 is threaded to a tubing string 18, such as, for example, a casing string, which is filled with tubing fluids. Sliding sleeve assembly 10 may contain other internal components, such as, for example, top and bottom internal collars (not shown) used to limit the stroke of the sliding sleeve.

Still referring to FIGS. 4A-4C, a magnetic-type logging tool 33 is suspended from wireline 36 and positioned inside sliding sleeve assembly 10 (shown in an open-position in FIG. 4A). Logging tool 33 includes a tool body 38 deployed along a wireline 36, centralizers (not shown), and one or more magnetic field transmitting coils 34. Although illustrated as one coil, note that the transmitting coil may be one or more separate coils. After the magnetic fields are emitted by coil 34, receiving coil 24 detects the secondary magnetic field which, again, alters the voltage potential and deforms the transducer of fiber optic sensor 26. The deformation then produces strain in cable 28, which then produces the response signals, as previously described. Thereafter, the response signal is communicated via cable 28 to a light detection unit and converted by on-board or remote processing circuitry to determine the operational position of the sliding sleeve.

As magnetic logging tool 33 is logged past sliding sleeve assembly 10, a change in the recorded signal (log) is witnessed, reflecting the change in diameter and wall thickness of sliding sleeve assembly 10 from that of the tubing. Such a change is reflected in FIG. 4D, which shows a log of the response signal level verses depth for an open (FIG. 4A), partially closed (FIG. 4B), and fully closed (FIG. 4C) sleeve assembly. Part of the sleeve response is due to stationary features of tubing 18 or sliding sleeve assembly 10, such as housing 12 and other stationary internal components. The stationary features are independent of the sliding sleeve position. Another portion of the sleeve response is due to sliding sleeve 14 (i.e., sliding sleeve response). The sliding sleeve response varies with the position of sliding sleeve 14, as indicated by the 3 dotted lines showing the alignment of sleeve 14 in FIGS. 4A-4C with their respective signal levels in FIGS. 4D-4E. In general, for any sleeve position, there exists a unique signal pattern (i.e., signature) which is the combination of signals due to stationary and movable features in sliding sleeve assembly 10.

Although not shown, an intervention tool may be positioned above logging tool 33. The intervention tool is utilized to actuate sliding sleeve 14 between open and closed positions. The intervention tool is comprised of non-conducting material on the outside to avoid shorting of current, and may include a variety of actuation mechanisms, such as, for example, "catching" mechanisms actuated with shear or release forces, "collet" mechanisms that are actuated based on applied pressure which in combination with tool weight exceeds the threshold for releasing. In other methods, however, the sliding sleeves described herein may be actuated remotely.

Therefore, in order to detect the operational condition of sliding sleeve 14, in certain methods, a baseline log is first recorded before sleeve 14 is actuated (e.g., open sleeve log of FIG. 4D). After actuation, a second log (i.e., response log) is recorded and compared with the baseline log (in FIG. 4D, the response log may be the partially closed or closed sleeve logs). The distance sleeve 14 has travelled upon actuation can be detected by comparing the two logs. In certain illustrative methods, the amplitude of the two logs is normalized to eliminate any drifts in the signal level from one measurement to the other. For this normalization, a flat response of the tubing can be utilized.

In order to extract the sleeve displacement from the comparison of the baseline and response logs, both logs have to be well aligned (with respect to the true depth). In certain methods, alignment may be accomplished by aligning parts of the sleeve assembly response signal that are due to stationary features. In FIG. 4D, for example, this may be the portion of the response log representing the stationary housing 12. This is an accurate method by which to align since it relies on features in sliding sleeve assembly 10 in close vicinity to sliding sleeve 14, and hence it is less vulnerable to depth drifts in the measured logs. When logging a sleeve assembly having multiple sleeves, the alignment process can be done for each sleeve independently if needed.

In an alternate method, the baseline and response logs may be aligned by using features in the hosting tubing 18, such as collars, for example. The closest collar to each sleeve 14 can be used to locally align the logs at the respective sleeves. This method works accurately as long as the collars are within sufficiently small distances (e.g., ~30 ft. or less) from sleeves 14.

In yet another method, the baseline and response logs may be aligned using features in the wellbore formation logged by tool 33, which has the capability to look behind the tubing and the casing, such as a gamma tool, for example. If a gamma tool is included in the logging tool string, gamma logs in the vicinity of each sleeve assembly 10 can be used to locally align the logs at the respective sleeves 14.

Once the baseline and response logs are aligned, they are compared to detect the displacement of sliding sleeve 14. In certain illustrative methods, the comparison may be performed by subtracting the baseline log from the response log. FIG. 4E illustrates the response signal level verses depth of two differential logs (A/B) of a baseline and response log taken from FIG. 4D. Note, again, that the baseline log may simply be a first log, while the response log is a second log. In FIG. 4E, two differential logs are shown; however, only one differential log is needed to determine the operational position of the sleeve. The differential logs reflect the differential response between two logs (any first baseline and second response log) of FIG. 4D. For example, the baseline and partially closed logs of FIG. 4D may be reflected in one of the differential logs of log of FIG. 4E. Reviewing FIG. 4E, it can be seen that the operational position of the sleeve of differential log A has travelled a distance of 1 feet, while the sleeve of differential log B has travelled a distance of 0.5 feet.

Given the dimensions of the sleeves and the maximum displacement they are allowed to move, the distance the sleeves move after actuation relative to the baseline can be related to the operational condition of the sleeves (e.g., open/closed/partially open). If the distance travelled by the sleeve is equal to the maximum displacement the sleeve can move, then the operation condition of the valve can be precisely determined as either fully open or fully closed. Otherwise, if the distance travelled by the sleeve is less than the maximum displacement, the operational condition of the valve cannot be determined unless the baseline condition is known. Once the baseline is known, the distance the sleeve has traveled can be correlated to the true depth, and then the operational position of the sleeve can be determined.

Therefore, in certain illustrative methods of the present disclosure, the initial operational position of the sliding sleeves can be determined with high degree of certainty by actuating the sleeves several times to either fully open or fully closed position (for example, in mechanically actuated sleeves, the lock is engaged and hammered several times to make sure that the sleeve is open or closed). After this is done, the sliding sleeve assembly is logged to establish the baseline log. Note that, in certain methods, this baseline log can be generated at the surface before the sleeve assembly is deployed, or this log can be performed downhole after the sleeve assembly has been deployed. A known baseline can be also be achieved by using more conventional (but less reliable and accurate) methods of measuring the sliding sleeve movement such as by monitoring the changes in the pressure of the well as a function of time. After the baseline measurement is performed, position of the sleeve can be tracked by adding together the displacements that are measured.

Figure 5:
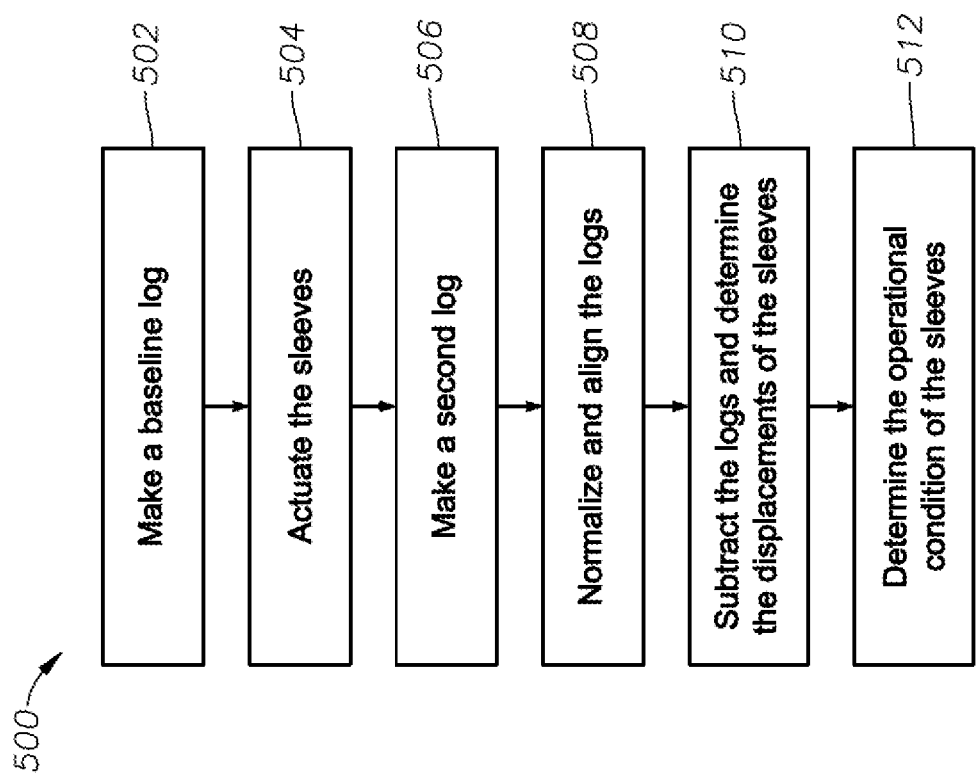
FIG. 5 is a flowchart of a method for detecting the operational condition of the sleeves using two in-situ logs, according to certain illustrative methods of the present disclosure.

FIG. 5 is a flowchart of a method 500 for detecting the operational condition of a moveable device (e.g., sliding sleeve) using two in-situ logs, according to certain illustrative methods of the present disclosure. Sliding sleeves are typically in the order of 3-5 ft. Therefore, in certain methods, to detect the sleeve position accurately, the tool is logged in steps of 0.5 ft. or less. As previously stated, the operational position of a variety of moveable devices may be determined using the methods described herein. Such devices may include, for example, a gas choke or sliding sleeve. Thus, in method 500 a sliding sleeve is described. After the magnetic-based logging tool has been deployed downhole, method 500 begins with estimating the initial operational position of the sliding sleeve (e.g., fully closed or open). At block 502, the logging tool logs the sliding sleeve assembly to generate the baseline log. At block 504, the sleeve is then actuated to another operational position using, for example, an intervention tool or some remote means (e.g., hydraulic line). At block 506, the logging tool then logs the sleeve assembly a second time to generate the response log. At block 508, the baseline and response logs are normalized and aligned. At block 510, the baseline and response logs are subtracted, whereby the displacement of the sleeve is determined (as described in relation to FIG. 4E). At block 512, the operational position of the sleeve is then determined.

Figure 6:
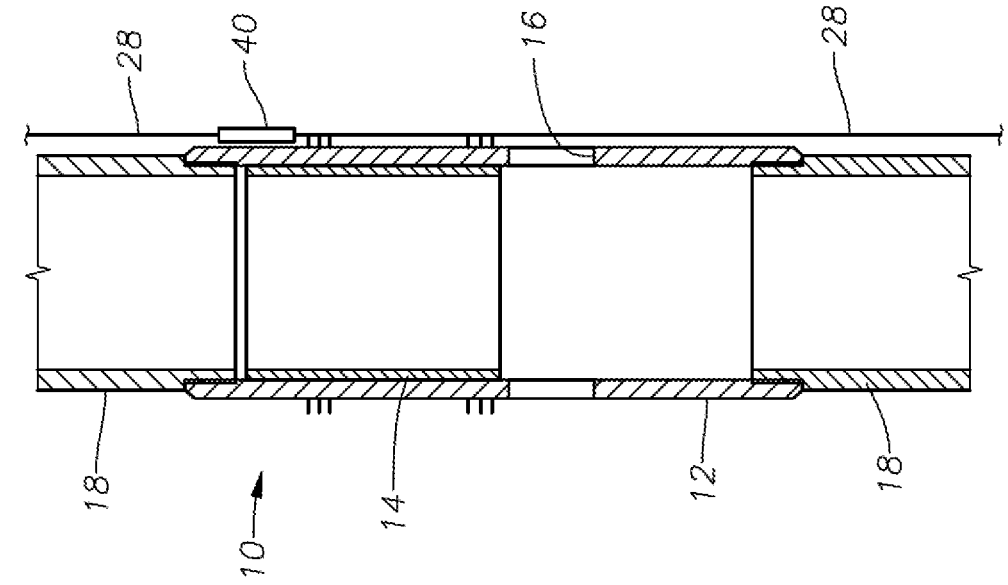
FIG. 6 is a sectional view of a downhole assembly to detect the operational position of a moveable device using a fiber optic temperature or acoustic sensor, according to certain illustrative embodiments of the present disclosure.

FIG. 6 is a sectional view of a downhole assembly to detect the operational position of a moveable device using a fiber optic temperature or acoustic sensor, according to certain illustrative embodiments of the present disclosure. The embodiment of FIG. 6 is similar to other embodiments described herein, as like numerals refer to like elements. However, in FIG. 6, fiber optic distributed temperature sensing ("DTS") is used to detect the operational condition of the sliding sleeve valve by monitoring the change in temperate associated with opening or closing the valve. In this embodiment, a fiber optic temperature sensor 40 acquires a baseline DTS measurement before sleeve 14 is actuated. This baseline measurement will be proportional to the temperature of the rock matrix at locations where sleeve 14 is closed, and will be proportional to the temperature of the fluids flowing into tubing 18 at locations where sleeve 14 is open. Upon sleeve actuation, a slight change in temperature will be witnessed as a result of the change in the fluids flow rate. Typically, the DTS systems can locate the temperature to a spatial resolution of 1 m with a resolution of 0.01° C. In certain illustrative methods, the operational position of the actuated sleeves can be determined by comparing the post-actuation distributed temperature response signal/log with the baseline response signal and/or log.

In an alternate embodiment, still referring to FIG. 6, fiber optic distributed acoustic sensing may be used to detect the operational condition of moveable devices by monitoring the acoustic vibrations associated with opening or closing the moveable devices. Fiber optic acoustic sensors effectively turns fiber cable 28 into a series of geophones (or microphones) to identify fluid densities, fluid migration, and casing leaks, or for early detection of equipment wear or failure. In this embodiment, the operational condition of the actuated sleeve 14 may be determined by comparing the post-actuation distributed acoustic response with a baseline acoustic response. Referring back to FIGS. 4A-4E, an illustrative model of the present disclosure was conducted and will now be described. The following model parameters were used:

1. Tubing: 5" OD, 0.2" thick, carbon steel (conductivity=$10^7$ S/m, relative permeability=100).
2. Sliding sleeve housing: 5.2" OD, 0.2" thick, 5 ft. long, carbon steel.
3. Sliding sleeve insert: 4.8" OD, 0.2" thick, 2 ft. long, carbon steel.
4. Internal collars: 4.8" OD, 0.05" thick, 0.5 ft. long, carbon steel.
5. Transmitter/receiver coils: 2" diameter, 6" long. 100 turns, injected current=0.1 A.
6. Tubing fluid resistivity=100 Ohm.m.
7. Frequency=100 Hz.
8. Logging vertical resolution=0.1 ft.

The baseline and the post-actuation logs (i.e., response log) are shown in FIG. 4D after alignment and normalization. The differential logs obtained, by subtracting off the baseline, are shown in FIG. 4E. The width of the differential signal corresponds to the sleeve displacement (1 foot for differential log A, 0.5 feet for differential log B in FIG. 4E.)

The signals shown in FIG. 4D are obtained in the frequency-domain, and represent the total signal (direct signal+tubing and sleeve signals). Alternatively, measurements can be acquired in the time-domain by transmitting transient pulses and measuring the decay response versus time.

FIGS. 7A-7C illustrate azimuthally sensitive downhole assemblies to detect the position of moveable devices, accordingly to certain illustrative embodiments of the present disclosure. Downhole assemblies of FIGS. 7A-7C are similar to previous embodiments described herein and, therefore, may be best understood with reference thereto, where like numerals indicate like elements. However, in this embodiment, multiple sleeves exist within the same assembly to independently control flow from different ports. Azimuthal detection of the operational condition of multiple sleeves 14A and 14B can be achieved by positioning multiple azimuthally distributed fiber optic sensors 42A-N, which may be any of the sensors described herein. This array of sensors 42A-N can be mounted on one fiber optic line, as in FIGS. 7A and 7B, or multiple fiber optic lines as in FIG. 7C. In FIG. 7A, sensors 42A-N are shown in a helical shape, while FIG. 7B shows the sensors in a serpentine shape, and FIG. 7C shows an array of sensors on multiple fiber cables.

These azimuthally sensitive embodiments provide a 2-D (axial and azimuthal) image of the inside of the tubing. This image reflects any variation in the inner diameter or thickness of the tubing, from which the operational position of different sliding sleeves (at different azimuthal and/or axial locations) can be detected using the same processes described herein.

Figure 8:
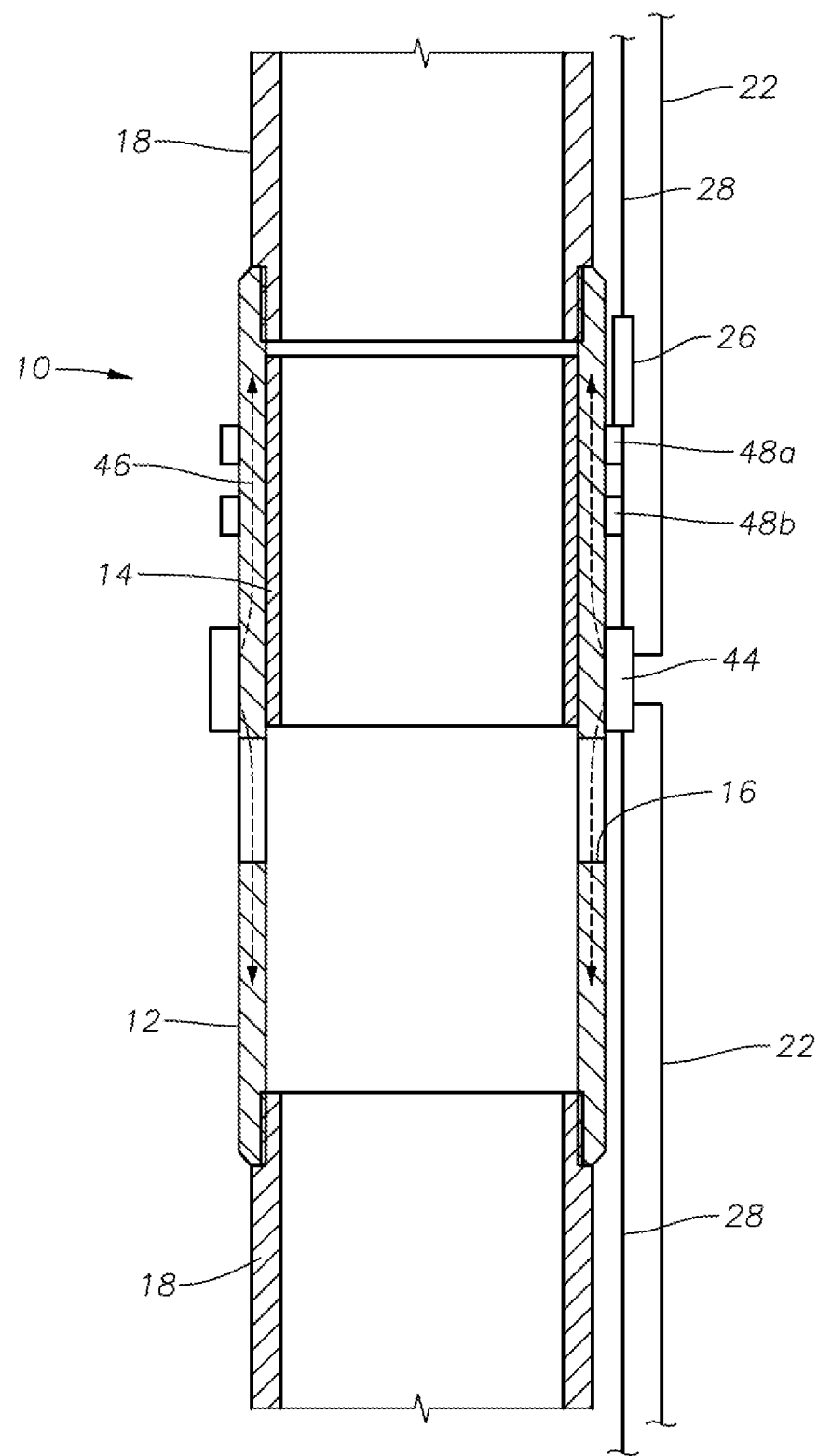
FIG. 8 is a sectional view of a downhole assembly to detect the operational position of a moveable device using electric fields emitted by an electrode, according to certain illustrative embodiments of the present disclosure.

FIG. 8 is a sectional view of a downhole assembly to detect the operational position of a moveable device using electric fields emitted by an electrode, according to certain illustrative embodiments of the present disclosure. The embodiment of FIG. 8 is similar to other embodiments described herein, as like numerals refer to like elements. However, in FIG. 8, electric fields are emitted using one or more injection electrodes 44 positioned along housing 12 adjacent to sliding sleeve 14. The electric field emitted by electrode(s) 44 produces a current 46 along sliding sleeve 14, which in turn produces a secondary electric field emitted from sliding sleeve 14. The secondary electric field are then received using a pair of receiving electrodes 48a and 48b positioned along housing 12 adjacent to sliding sleeve 14. The received secondary electric fields produce a voltage potential between receiving electrodes 48a and 48b. The voltage potential then deforms a transducer (e.g., piezoelectric transducer) coupled to receiving electrodes 48a and 48b. In this example, the transducer is the fiber optic sensor 26. The deformation of sensor 26 induces a strain in optic fiber 28, thereby generating the response signal which is interrogated remotely (e.g., uphole) to determine the operational position of sliding sleeve 14.

Figure 9:
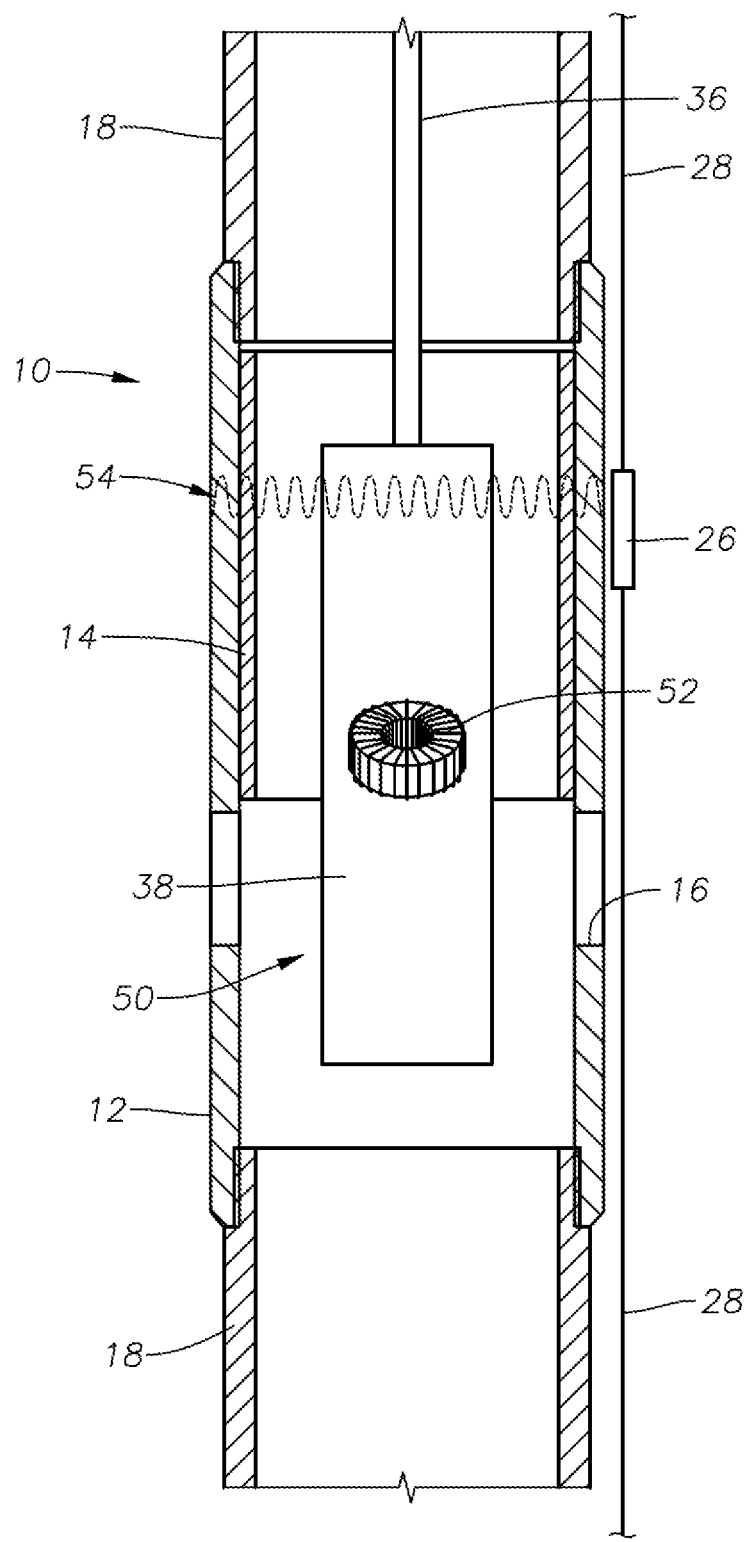
FIG. 9 is a sectional view of a downhole assembly to detect the operational position of a moveable device using electric fields emitted by a toroid, according to certain illustrative embodiments of the present disclosure.

FIG. 9 is a sectional view of a downhole assembly to detect the operational position of a moveable device using electric fields emitted by a toroid, according to certain illustrative embodiments of the present disclosure. The embodiment of FIG. 9 is similar to other embodiments described herein, as like numerals refer to like elements. However, in FIG. 9, logging tool 50 is suspended from wireline 36 and positioned inside sliding sleeve assembly 10 (shown in an open-position). Logging tool 50 includes a tool body 38, centralizers (not shown), and a transmitting toroid 52 for emitting electric fields. The emitted electric fields interacts with sliding sleeve 14 to produce secondary electric fields which are then detected by a receiver toroid 54 wrapped around housing 12 adjacent sliding sleeve 14. The received secondary electric fields produce a voltage potential within receiver toroid 54, which is then used to deform the transducer of fiber optic sensor 26. Again, the deformation induces a strain in optical fiber 28, thereby producing the response signal used to determine the operational position of sliding sleeve 14.

In yet another alternative embodiment using electric fields, the secondary electric fields may be received using an electrostrictive element-based fiber optic sensor positioned adjacent to the moveable device. Once received, the electrostrictive element will deform, thereby inducing strain in the optical fiber. The induced strain then produces the response signals used to determine the operational position of the sliding sleeve.

Figure 10:
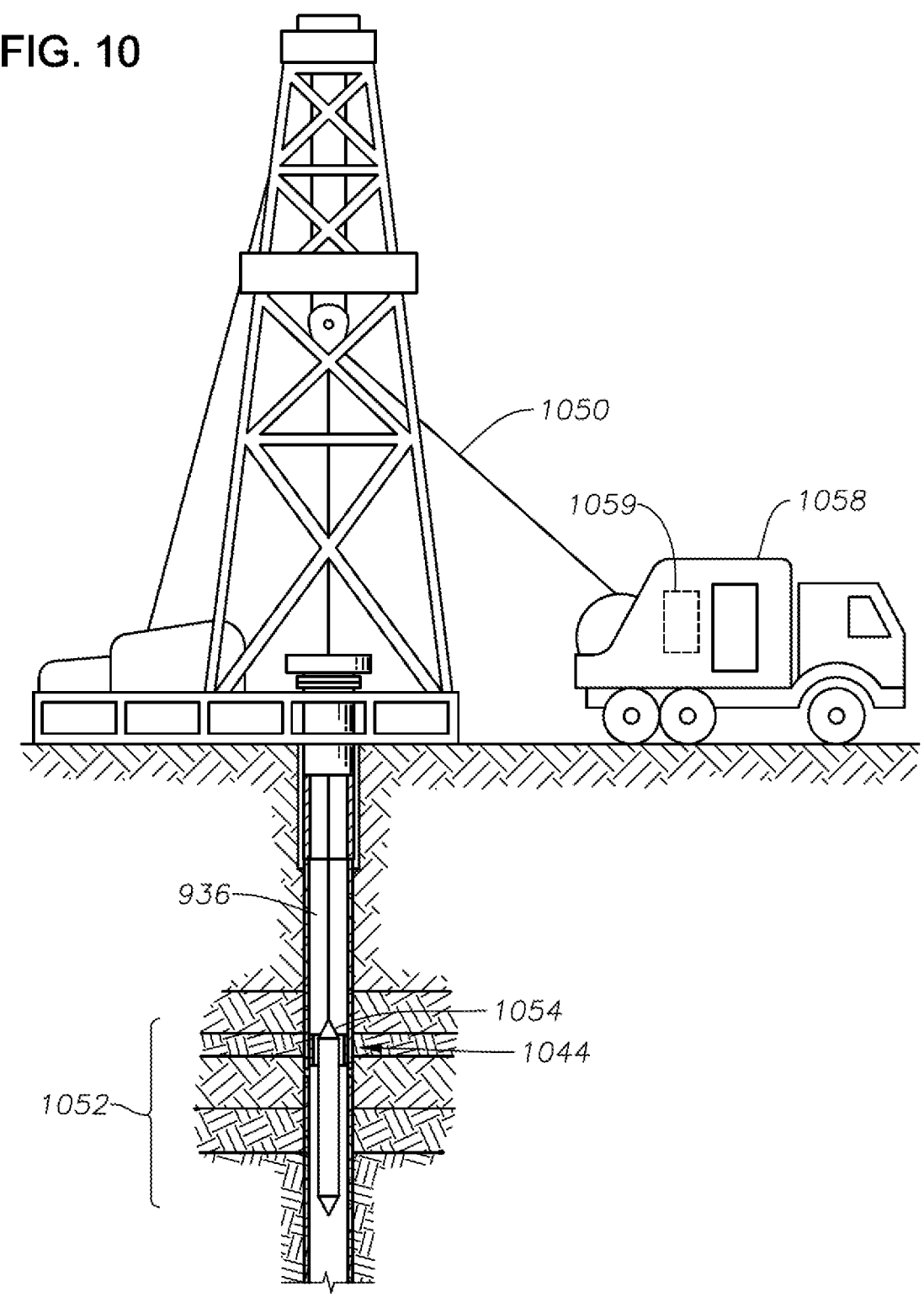
FIG. 10 illustrates a logging tool deployed along a wireline to determine the operational position of a downhole moveable device, according to illustrative embodiments of the present disclosure.

FIG. 10 illustrates a logging tool deployed along a wireline to determine the operational position of a downhole moveable device, according to illustrative embodiments of the present disclosure. As shown in FIG. 10, a wireline tool string 1052 (e.g., magnetic-type logging tool of FIG. 4) as described herein can be lowered into borehole 936 by a cable 1050 to detect the operational position of a moveable device 1044 (e.g., sleeve). In some embodiments, cable 1050 includes conductors and/or optical fibers for transporting power to wireline tool string 1052 and data/communications from wireline tool string 1052 to the surface. It should be noted that various types of formation property sensors can be included with wireline tool string 1052. In accordance with the disclosed moveable device position detection techniques, the illustrative wireline tool string 1052 includes logging sonde 1054 with the necessary transmitting coil, for example to emit magnetic fields as described herein. Although not shown, the receiving coil (positioned around moveable device 1044) detects the secondary magnetic field to deform the transducer of the fiber optic sensor (not shown) along moveable device 1044 to produce the response signal, as described above. The response signal is then communicated uphole to a processing facility 1058 (e.g., wireline logging facility) whereby the operational position of device 1044 is determined using computing facility 1059.

In yet other alternative embodiments, the logging tools described herein may be conveyed downhole using, for example, slickline, downhole tractors, coiled tubing, or other tubulars.

Accordingly, the illustrative embodiments and methods described herein provide a variety of advantages. First, for example, the disclosed methods do not require any customized sleeves or any modifications to existing sleeves, as the fiber sensors can be clamped or otherwise affixed to the tubulars. Second, the disclosed methods provide a real-time, interventionless detection method whereby no logging tools are required. Third, logging imagers can be used to detect the operational condition of different azimuthally distributed sleeves. Fourth, the disclosed methods obviate any need for mechanical sensing of the gap between the endpoint of the insert and the housing, as such conventional mechanical sensing can be unreliable and difficult to interpret. Fifth, the displacement of the sleeves can be detected using simple processing; no sophisticated inversion is needed.

Embodiments described herein further relate to any one or more of the following paragraphs:

1. A method for detecting a position of a downhole moveable device, the method comprising emitting electric or magnetic fields into a wellbore which interact with a moveable device to produce secondary electric or magnetic fields; using a fiber optic sensor, detecting the secondary electric or magnetic fields and thereby generating response signals; and determining an operational position of the moveable device using the response signals.

2. A method as defined in paragraph 1, wherein the magnetic fields are emitted using a transmitter coil positioned adjacent to the moveable device; and detecting the secondary magnetic fields comprises: receiving the secondary magnetic fields using a receiver coil positioned adjacent to the moveable device, thereby generating a corresponding voltage potential in the receiver; using the voltage potential, deforming a transducer coupled to the receiver coil and an optical fiber; and using the deformation, inducing strain in the optical fiber to thereby generate the response signals.

3. A method as defined in paragraphs 1 or 2, wherein the magnetic fields are emitted using a transmitter coil positioned adjacent to the moveable device; and detecting the secondary magnetic fields comprises: receiving the secondary magnetic fields using a magnetostrictive element positioned adjacent to the moveable device, thereby deforming the magnetostrictive element; using the deformation, inducing strain in an optical fiber coupled to the magnetostrictive element to thereby generate the response signals.

4. A method as defined in any of paragraphs 1-3, wherein the magnetic fields are emitted using a magnet positioned adjacent to the moveable device; and detecting the secondary magnetic fields comprises receiving the secondary magnetic fields using a magnetostrictive element positioned adjacent to the moveable device, thereby deforming the magnetostrictive element; using the deformation, inducing strain in an optical fiber coupled to the magnetostrictive element to thereby generate the response signals.

5. A method as defined in any of paragraphs 1-4, wherein the magnetic fields are emitted using a magnet positioned adjacent to the moveable device; and detecting the secondary magnetic fields comprises: receiving the secondary magnetic fields using a receiver coil positioned adjacent to the moveable device, thereby generating a corresponding voltage potential in the receiver; using the voltage potential, deforming a transducer coupled to the receiver coil and an optical fiber; and using the deformation, inducing strain in the optical fiber to thereby generate the response signals.

6. A method as defined in any of paragraphs 1-5, wherein the electric fields are emitted using a transmitter toroid positioned adjacent to the moveable device; and detecting the secondary electric fields comprises: receiving the secondary electric fields using a receiver toroid positioned adjacent to the moveable device, thereby generating a corresponding voltage potential in the receiver toroid; using the voltage potential, deforming a transducer coupled to the receiver toroid and an optical fiber; and using the deformation, inducing strain in the optical fiber to thereby generate the response signals.

7. A method as defined in any of paragraphs 1-6, wherein the electric fields are emitted using a transmitter toroid positioned adjacent to the moveable device; and detecting the secondary electric fields comprises: receiving the secondary electric fields using an electrostrictive element positioned adjacent to the moveable device, thereby deforming the electrostrictive element; using the deformation, inducing strain in an optical fiber coupled to the electrostrictive element to thereby generate the response signals.

8. A method as defined in any of paragraphs 1-7, wherein the electric fields are emitted using at least one electrode positioned adjacent to the moveable device; and detecting the secondary electric fields comprises: receiving the secondary electric fields using a pair of electrodes positioned adjacent to the moveable device, thereby generating a corresponding voltage potential in the electrodes; using the voltage potential, deforming a transducer coupled to the electrodes and an optical fiber; and using the deformation, inducing strain in the optical fiber to thereby generate the response signals.

9. A method as defined in any of paragraphs 1-8, wherein the magnetic fields are emitted using a transmitting coil of a logging tool; and detecting the secondary magnetic fields comprises receiving the secondary magnetic fields using a receiver coil positioned adjacent to the moveable device, thereby generating a corresponding voltage potential in the receiver; using the voltage potential, deforming a transducer coupled to the receiver coil and an optical fiber; and using the deformation, inducing strain in the optical fiber to thereby generate the response signals.

10. A method as defined in any of paragraphs 1-9, wherein the electric fields are emitted using a transmitting toroid of a logging tool; and detecting the secondary electric fields comprises: receiving the secondary electric fields using a receiver toroid positioned adjacent to the moveable device, thereby generating a corresponding voltage potential in the receiver toroid; using the voltage potential, deforming a transducer coupled to the receiver toroid and an optical fiber; and using the deformation, inducing strain in the optical fiber to thereby generate the response signals.

11. A method as defined in any of paragraphs 1-10, wherein determining the operational position comprises: using the response signals to generate a response log of the moveable device at one or more operational positions; comparing the response log with a baseline log of the moveable device; and determining the operational position of the moveable device based upon the comparison.

12. A method as defined in any of paragraphs 1-11, wherein the baseline log is generated at a surface location.

13. A method as defined in any of paragraphs 1-12, wherein the baseline log is generated within the wellbore.

14. A method as defined in any of paragraphs 1-13, wherein the baseline log is generated before the moveable device is actuated; and the response log is generated after the moveable device is actuated.

15. A method as defined in any of paragraphs 1-14, wherein comparing the response log with the baseline log comprises using a pattern recognition technique to perform the comparison.

16. A method as defined in any of paragraphs 1-15, wherein comparing the response log with the baseline log comprises using an inversion technique to perform the comparison.

17. A method as defined in any of paragraphs 1-16, further comprising aligning the response log and baseline log with respect to true depth.

18. A method as defined in any of paragraphs 1-17, wherein the moveable device is a sliding sleeve that forms part of a sliding sleeve assembly; and the alignment is achieved by aligning portions of the response log and baseline log representing stationary features of the sliding sleeve assembly.

19. A method as defined in any of paragraphs 1-18, wherein the alignment is achieved by aligning portions of the response log and baseline log representing features of a tubing along which the moveable device is positioned.

20. A method as defined in any of paragraphs 1-19, wherein the feature is a collar.

21. A method as defined in any of paragraphs 1-20, wherein the alignment is achieved by aligning portions of the response log and baseline log representing a wellbore formation.

22. A method as defined in any of paragraphs 1-21, wherein the moveable device is a sliding sleeve that forms part of a sliding sleeve assembly.

23. A method as defined in any of paragraphs 1-22, wherein determining the operational position comprises using the response signals to generate a response log of the moveable device; comparing the response log to a baseline log library, the baseline log library containing logs having response signals of the moveable device at a plurality of operational positions; and determining the operational position of the moveable device based upon the comparison.

24. A method as defined in any of paragraphs 1-23, wherein determining the operational position comprises azimuthally determining the operational position of a plurality of moveable devices.

25. A method as defined in any of paragraphs 1-24, wherein multiple azimuthally distributed fiber optic sensors are utilized to determine the operational position of the moveable devices.

26. A method as defined in paragraph 1-25, further comprising generating an image of downhole tubing based upon the azimuthally determined operational position of the moveable device.

27. A method as defined in any of paragraphs 1-26, wherein the moveable device is positioned along a tubular workstring; and fiber optic sensor is positioned outside the tubular workstring.

28. A method as defined in any of paragraphs 1-27, wherein determining the operational position comprises determining a partially open operational position of the moveable device.

29. A downhole assembly to detect a position of a moveable device, the assembly comprising an electric or magnetic field emitting device positioned adjacent a moveable device forming part of a tubular workstring, wherein the emitting device emits electric or magnetic fields that interact with the moveable device to produce secondary electric or magnetic fields; and a fiber optic sensor positioned outside the tubular workstring, wherein the fiber optic sensor detects the secondary electric or magnetic fields and thereby produces response signals used to determine an operational position of the moveable device.

30. A downhole assembly as defined in paragraph 29, wherein the emitting device is a transmitting coil or toroid positioned around the tubular workstring; and the fiber optic sensor comprises: a receiving coil or toroid positioned around the tubular workstring; a transducer coupled to the receiving coil or toroid; and a fiber optic cable coupled to the transducer.

31. A downhole assembly as defined in paragraphs 29 or 30, wherein the emitting device is a transmitting coil or toroid positioned around the tubular workstring; and the fiber optic sensor comprises: a magnetostrictive or electrostrictive element; and a fiber optic cable coupled to the magnetostrictive or electrostrictive element.

32. A downhole assembly as defined in any of paragraphs 29-31, wherein the emitting device is a magnet positioned around the tubular workstring; and the fiber optic sensor comprises a magnetostrictive element; and a fiber optic cable coupled to the magnetostrictive element.

33. A downhole assembly as defined in any of paragraphs 29-32, wherein the emitting device is a magnet positioned around the tubular workstring; and the fiber optic sensor comprises a receiving coil positioned around the tubular workstring; a transducer coupled to the receiving coil; and a fiber optic cable coupled to the transducer.

34. A downhole assembly as defined in any of paragraphs 29-33, wherein the emitting device is a transmitting coil or toroid positioned along a logging tool deployed along the tubular workstring; and the fiber optic sensor comprises: a receiving coil or toroid positioned around the tubular workstring; a transducer coupled to the receiving coil or toroid; and a fiber optic cable coupled to the transducer.

35. A downhole assembly as defined in any of paragraphs 29-34, wherein the moveable device is a sliding sleeve.

36. A downhole assembly as defined in any of paragraphs 29-35, further comprising multiple fiber optic sensors azimuthally distributed around the tubular workstring.

37. A downhole assembly as defined in any of paragraphs 29-36, wherein the emitting device is a transmitting coil positioned around the tubular workstring.

38. A downhole assembly as defined in any of paragraphs 29-37, wherein the emitting device is a magnet positioned around the tubular workstring.

39. A downhole assembly as defined in any of paragraphs 29-38, wherein the tubular workstring is a casing or production tubular.

40. A method for detecting a position of a downhole moveable device, the method comprising determining an operational position of a downhole moveable device using a fiber optic temperature sensor.

41. A method as defined in paragraph 40, wherein determining the operational position comprises measuring a first temperature of the moveable device before actuation; and measuring a second temperature of the moveable device after actuation; comparing the first and second temperatures to determine the operational position.

42. A method as defined in paragraph 40 or 41, wherein determining the operational position comprises monitoring a temperature change associated with the operational position of the moveable device.

43. A method as defined in any of paragraphs 40-42, wherein the operational position of a sliding sleeve is determined.

44. A method as defined in any of paragraphs 40-43, wherein a partially open operational position of the moveable device is determined.

45. A downhole assembly to detect a position of a moveable device, the assembly comprising a fiber optic temperature sensor adjacent a moveable device positioned along a tubular workstring; and a fiber optic cable coupled to the fiber optic temperature sensor.

46. A downhole assembly as defined in paragraph 45, wherein the fiber optic temperature sensor is positioned outside the tubular workstring.

47. A downhole assembly as defined in paragraphs 45 or 46, wherein the moveable device is a sliding sleeve.

48. A downhole assembly as defined in any of paragraphs 45-47, wherein the tubular workstring is a casing or production tubular.

49. A method for detecting a position of a downhole moveable device, the method comprising determining an operational position of a downhole moveable device using a fiber optic acoustic sensor.

50. A method as defined in paragraph 49, wherein determining the operational position comprises measuring a first acoustic vibration of the moveable device before actuation; and measuring a second acoustic vibration of the moveable device after actuation; comparing the first and second acoustic vibrations to determine the operational position.

51. A method as defined in paragraphs 49 or 50, wherein determining the operational position comprises monitoring acoustic vibrational changes associated with the operational position of the moveable device.

52. A method as defined in any of paragraphs 49-51, wherein the operational position of a sliding sleeve is determined.

53. A method as defined in any of paragraphs 49-52, wherein a partially open operational position of the moveable device is determined.

54. A downhole assembly to detect a position of a moveable device, the assembly comprising a fiber optic acoustic sensor adjacent a moveable device positioned along a tubular workstring; and a fiber optic cable coupled to the fiber optic acoustic sensor.

55. A downhole assembly as defined in paragraph 54, wherein the fiber optic acoustic sensor is positioned outside the tubular workstring.

56. A downhole assembly as defined in paragraphs 54 or 55, wherein the moveable device is a sliding sleeve.

57. A downhole assembly as defined in any of paragraphs 54-56, wherein the tubular workstring is a casing or production tubular.

Although various embodiments and methods have been shown and described, the disclosure is not limited to such embodiments and methods and will be understood to include all modifications and variations as would be apparent to one skilled in the art. For example, although sliding sleeves are described throughout this description, the methods are applicable to other downhole moveable devices as stated herein. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for detecting a position of a downhole moveable device, the method comprising:
    emitting electric or magnetic fields into a wellbore which interact with a moveable device to produce secondary electric or magnetic fields;
    using a fiber optic sensor, detecting the secondary electric or magnetic fields and thereby generating response signals;
    determining an operational position of the moveable device using the response signals; and
    wherein:
        the magnetic fields are emitted using a transmitter coil or magnet positioned adjacent to the moveable device; and
        detecting the secondary magnetic fields comprises:
            receiving the secondary magnetic fields using a receiver coil positioned adjacent to the moveable device, thereby generating a corresponding voltage potential in the receiver;
            using the voltage potential, deforming a transducer coupled to the receiver coil and an optical fiber; and
            using the deformation, inducing strain in the optical fiber to thereby generate the response signals.

2. A method as defined in claim 1, wherein determining the operational position comprises:
    using the response signals to generate a response log of the moveable device at one or more operational positions;
    comparing the response log with a baseline log of the moveable device; and
    determining the operational position of the moveable device based upon the comparison.

3. A method as defined in claim 2, wherein the baseline log is generated at a surface location or within the wellbore.

4. A method as defined in claim 2, wherein:
    the baseline log is generated before the moveable device is actuated; and
    the response log is generated after the moveable device is actuated.

5. A method as defined in claim 2, wherein comparing the response log with the baseline log comprises using a pattern recognition technique to perform the comparison.

6. A method as defined in claim 2, wherein comparing the response log with the baseline log comprises using an inversion technique to perform the comparison.

7. A method as defined in claim 2, further comprising aligning the response log and baseline log with respect to true depth.

8. A method as defined in claim 1, wherein the moveable device is a sliding sleeve that forms part of a sliding sleeve assembly.

9. A method as defined in claim 1, wherein determining the operational position comprises:
    using the response signals to generate a response log of the moveable device;
    comparing the response log to a baseline log library, the baseline log library containing logs having response signals of the moveable device at a plurality of operational positions; and
    determining the operational position of the moveable device based upon the comparison.

10. A method as defined in claim 1, wherein determining the operational position comprises azimuthally determining the operational position of a plurality of moveable devices.

11. A method as defined in claim 10, wherein multiple azimuthally distributed fiber optic sensors are utilized to determine the operational position of the moveable devices.

12. A method as defined in claim 1, wherein:
    the moveable device is positioned along a tubular workstring; and
    the fiber optic sensor is positioned outside the tubular workstring.

13. A method for detecting a position of a downhole moveable device, the method comprising:
    emitting electric or magnetic fields into a wellbore which interact with a moveable device to produce secondary electric or magnetic fields;
    using a fiber optic sensor, detecting the secondary electric or magnetic fields and thereby generating response signals;
    determining an operational position of the moveable device using the response signals; and
    wherein:
        the magnetic fields are emitted using a transmitter coil or magnet positioned adjacent to the moveable device; and
        detecting the secondary magnetic fields comprises:
            receiving the secondary magnetic fields using a magnetostrictive element positioned adjacent to the moveable device, thereby deforming the magnetostrictive element; and
            using the deformation, inducing strain in an optical fiber coupled to the magnetostrictive element to thereby generate the response signals.

14. A method as defined in claim 13, wherein determining the operational position comprises:
    using the response signals to generate a response log of the moveable device at one or more operational positions;
    comparing the response log with a baseline log of the moveable device; and
    determining the operational position of the moveable device based upon the comparison.

15. A method as defined in claim 13, wherein:
    the moveable device is positioned along a tubular workstring; and
    the fiber optic sensor is positioned outside the tubular workstring.

16. A method for detecting a position of a downhole moveable device, the method comprising:
- emitting electric or magnetic fields into a wellbore which interact with a moveable device to produce secondary electric or magnetic fields;
- using a fiber optic sensor, detecting the secondary electric or magnetic fields and thereby generating response signals;
- determining an operational position of the moveable device using the response signals; and
- wherein:
  - the electric fields are emitted using a transmitter toroid or electrode positioned adjacent to the moveable device; and
    - detecting the secondary electric fields comprises:
      - receiving the secondary electric fields using a receiver toroid or a pair of electrodes positioned adjacent to the moveable device, thereby generating a corresponding voltage potential in the receiver toroid or pair of electrodes;
      - using the voltage potential, deforming a transducer coupled to the receiver toroid or pair of electrodes and an optical fiber; and
      - using the deformation, inducing strain in the optical fiber to thereby generate the response signals.

17. A method as defined in claim 16, wherein determining the operational position comprises:
- using the response signals to generate a response log of the moveable device at one or more operational positions;
- comparing the response log with a baseline log of the moveable device; and
- determining the operational position of the moveable device based upon the comparison.

18. A method as defined in claim 16, wherein:
- the moveable device is positioned along a tubular workstring; and
- the fiber optic sensor is positioned outside the tubular workstring.

19. A method for detecting a position of a downhole moveable device, the method comprising:
- emitting electric or magnetic fields into a wellbore which interact with a moveable device to produce secondary electric or magnetic fields, wherein the secondary electric or magnetic fields are induced in the moveable device by the emitted electric or magnetic fields;
- using a fiber optic sensor, detecting the secondary electric or magnetic fields and thereby generating response signals;
- determining an operational position of the moveable device using the response signals; and
- wherein:
  - the electric fields are emitted using a transmitter toroid positioned adjacent to the moveable device; and
  - detecting the secondary electric fields comprises:
    - receiving the secondary electric fields using an electrostrictive element positioned adjacent to the moveable device, thereby deforming the electrostrictive element; and
    - using the deformation, inducing strain in an optical fiber coupled to the electrostrictive element to thereby generate the response signals.

20. A method as defined in claim 19, wherein determining the operational position comprises:
- using the response signals to generate a response log of the moveable device at one or more operational positions;
- comparing the response log with a baseline log of the moveable device; and
- determining the operational position of the moveable device based upon the comparison.

21. A method as defined in claim 19, wherein:
- the moveable device is positioned along a tubular workstring; and
- the fiber optic sensor is positioned outside the tubular workstring.

* * * * *